(12) United States Patent
Baker et al.

(10) Patent No.: US 7,033,119 B2
(45) Date of Patent: Apr. 25, 2006

(54) VEHICLE SUPPORT PLATFORM

(76) Inventors: Gary Baker, Box 1838, Blackfalds, Alberta (CA) T0M 0J0; Greg Farrell, 3727 50th Avenue, Innisfail, Alberta (CA) T4G 1J1

( * ) Notice: Subject to any disclaimer, the term of this patent is extended or adjusted under 35 U.S.C. 154(b) by 55 days.

(21) Appl. No.: 10/789,866

(22) Filed: Mar. 1, 2004

(65) Prior Publication Data
US 2005/0191145 A1    Sep. 1, 2005

(51) Int. Cl.
*B60P 1/64* (2006.01)
(52) U.S. Cl. ............................. 410/66; 410/77; 410/30
(58) Field of Classification Search ................... 410/3, 410/4, 6, 7, 19, 30, 35, 46, 49, 52, 58, 66, 410/77
See application file for complete search history.

(56) References Cited

U.S. PATENT DOCUMENTS

| | | | | |
|---|---|---|---|---|
| 1,733,269 | A * | 10/1929 | Mauk et al. | 410/30 |
| 3,620,388 | A * | 11/1971 | Mansson | 108/53.1 |
| 3,728,971 | A | 4/1973 | Merrick | |
| 4,077,607 | A | 3/1978 | Lovelady | |
| 4,531,712 | A | 7/1985 | Christian et al. | |
| 4,901,980 | A * | 2/1990 | Hansen | 254/9 C |
| 4,930,333 | A * | 6/1990 | Marbury | 72/447 |
| 5,336,031 | A * | 8/1994 | Golan | 414/229 |
| 5,553,989 | A * | 9/1996 | Ullman | 414/537 |
| 5,639,174 | A * | 6/1997 | Gonska | 403/103 |
| 5,690,314 | A * | 11/1997 | Williams | 254/88 |
| 5,984,253 | A | 11/1999 | Bilyk | |
| 6,123,310 | A | 9/2000 | Paskiewicz | |
| 6,467,746 | B1 | 10/2002 | Paskiewicz | |
| 6,709,208 | B1 * | 3/2004 | Lyrstrand et al. | 410/115 |
| 6,733,219 | B1 * | 5/2004 | Floe | 410/3 |
| 6,824,338 | B1 * | 11/2004 | Looker | 410/67 |
| 2003/0061959 | A1 | 4/2003 | Johnson | |

FOREIGN PATENT DOCUMENTS

DE          2822798       * 12/1979

* cited by examiner

*Primary Examiner*—H. Gutman

(57) ABSTRACT

A vehicle support platform is provided. The vehicle support platform includes a vehicle support deck of generally rectangular shape attached to a support frame constructed of a plurality of frame members and a pair of ramps are pivotally attached to opposite ends of the support frame. The vehicle support platform can include a vehicle wheel engagement member for receiving a wheel of a vehicle and supporting the vehicle generally upright, can be folded into a compact storage position, can be used as a loading ramp and has a low profile height. Additionally a pivot assembly which allows the vehicle support platform to rotate about a fixed point is provided.

13 Claims, 5 Drawing Sheets

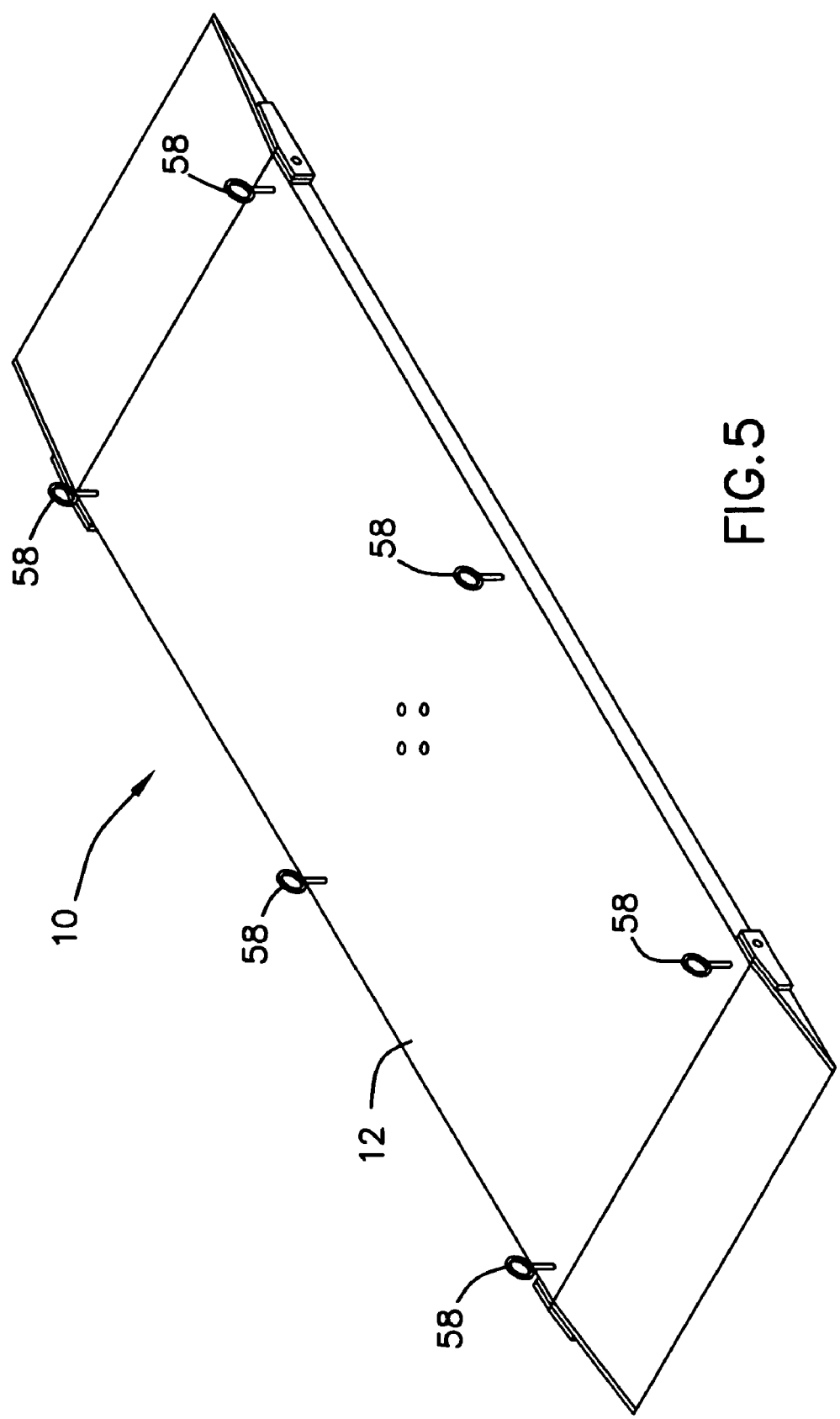

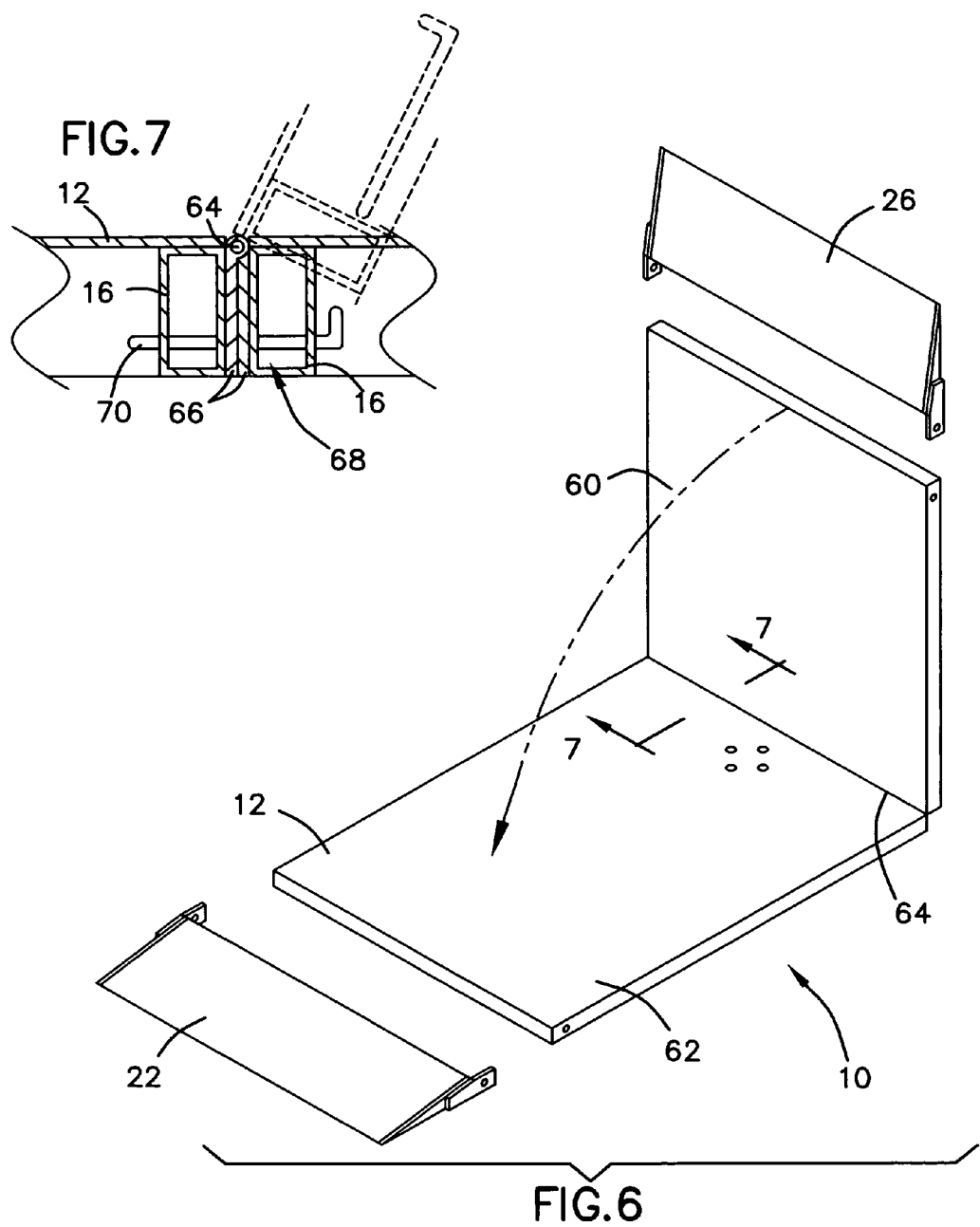

VEHICLE SUPPORT PLATFORM

FIELD OF THE INVENTION

The present invention relates generally to vehicle support platform. More particularly, relating to a support platform designed to support motorcycles, ATVs and snowmobiles so that the supported vehicle can be easily maneuvered within a confined space.

BACKGROUND OF THE INVENTION

When servicing a vehicle, such as a motorcycle, ATV, snowmobile and the like quite often the vehicle needs to be repositioned or rotated several times during the servicing of the vehicle. The repositioning or rotating the vehicle within a confined space, such as a typical family garage is a difficult task normally requiring moving the vehicle back and forth many times before the vehicle is correctly positioned. Frequently, the vehicle must be driven or wheeled out of the garage onto a parking pad where the vehicle is turned around and then driven or wheeled back into the garage. The difficulty of maneuvering the vehicle becomes more difficult when the vehicle is a motorcycle that can weigh upwards of 1200 lbs. Therefore a need exists for a vehicle support platform for easily maneuvering a vehicle within a confined space.

The prior art has recognized this need and has attempted to fulfill it by providing many devices intended to increase the positioning of vehicles in tight spaces. Examples of such prior art devices are described in U.S. Pat. No. 6,467,746 to Paskiewicz; U.S. Pat. No. 4,077,607 to Lovelady; U.S. Pat. No. 5,984,253 to Bilyk; U.S. published patent application 2003/0061959 to Johnson; U.S. published patent application 2003/0094601 to Chamoun; U.S. Pat. No. 3,728,971 to Merrick; and U.S. Pat. No. 4,531,712 to Christian et al.

While the above-described devices fulfill their respective, particular objectives and requirements, the aforementioned devices tend to be complex to operate, bulky and difficult to move, heavy, fixed in one position and not readably maneuvered and expensive to manufacture.

Therefore, a need exists for a new and improved vehicle support platform that can be used for supporting and maneuvering a vehicle within a confined space that is easy and inexpensive to manufacture, is light weight, is readably maneuverable, is simple to operate and is easily stored. In this regard, the present invention substantially fulfills this need. In this respect, the vehicle support platform according to the present invention substantially departs from the conventional concepts and designs of the prior art.

SUMMARY OF THE INVENTION

In accordance with the present invention, a vehicle support platform is provided. The vehicle support platform comprises a vehicle support deck of generally rectangular shape attached to a support frame constructed of a plurality of frame members. A pair of ramps pivotally attached to opposite ends of the support frame. Four high strength caster wheels are attached to the support frame for supporting the entire weight of the vehicle support platform and a vehicle positioned on the support platform on a support surface, and to provide non-restricted movement of the support platform across the support surface.

In additional embodiments, a pivot assembly can be provided to aid in rotating the vehicle support platform around a fixed point, the vehicle support platform is hinged and can be folded into a compact, folded storage position, and a vehicle wheel engagement member for receiving a wheel of a vehicle and supporting the vehicle in a generally upright is attached to the vehicle support deck and is releasably attached to the support deck.

Additionally, the vehicle support platform is constructed from a strong and lightweight material that makes it easy to handle and store. Moreover, the vehicle support platform has a very small profile height allowing the support platform to be stored on the floor of a garage without obstructing a vehicle from driving over it and it can be used as a loading ramp to load a vehicle, such as a motorcycle into the bed of a pickup truck.

There has thus been outlined, rather broadly, the more important features of the invention in order that the detailed description thereof that follows may be better understood and in order that the present contribution to the art may be better appreciated.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is an isometric view of the vehicle support platform of the present invention illustrating the use of tie-downs positioned around the perimeter thereof.

FIG. 6 is an isometric view of the vehicle support platform illustrating the support platform being folded into a compact, storage position.

FIG. 7 is a cross sectional view taken along line 7—7 in FIG. 6 illustrating a possible hinge arrangement.

The same reference numerals refer to the same parts throughout the various figures.

DETAILED DESCRIPTION OF THE PREFERRED EMBODIMENTS

Figure 1:
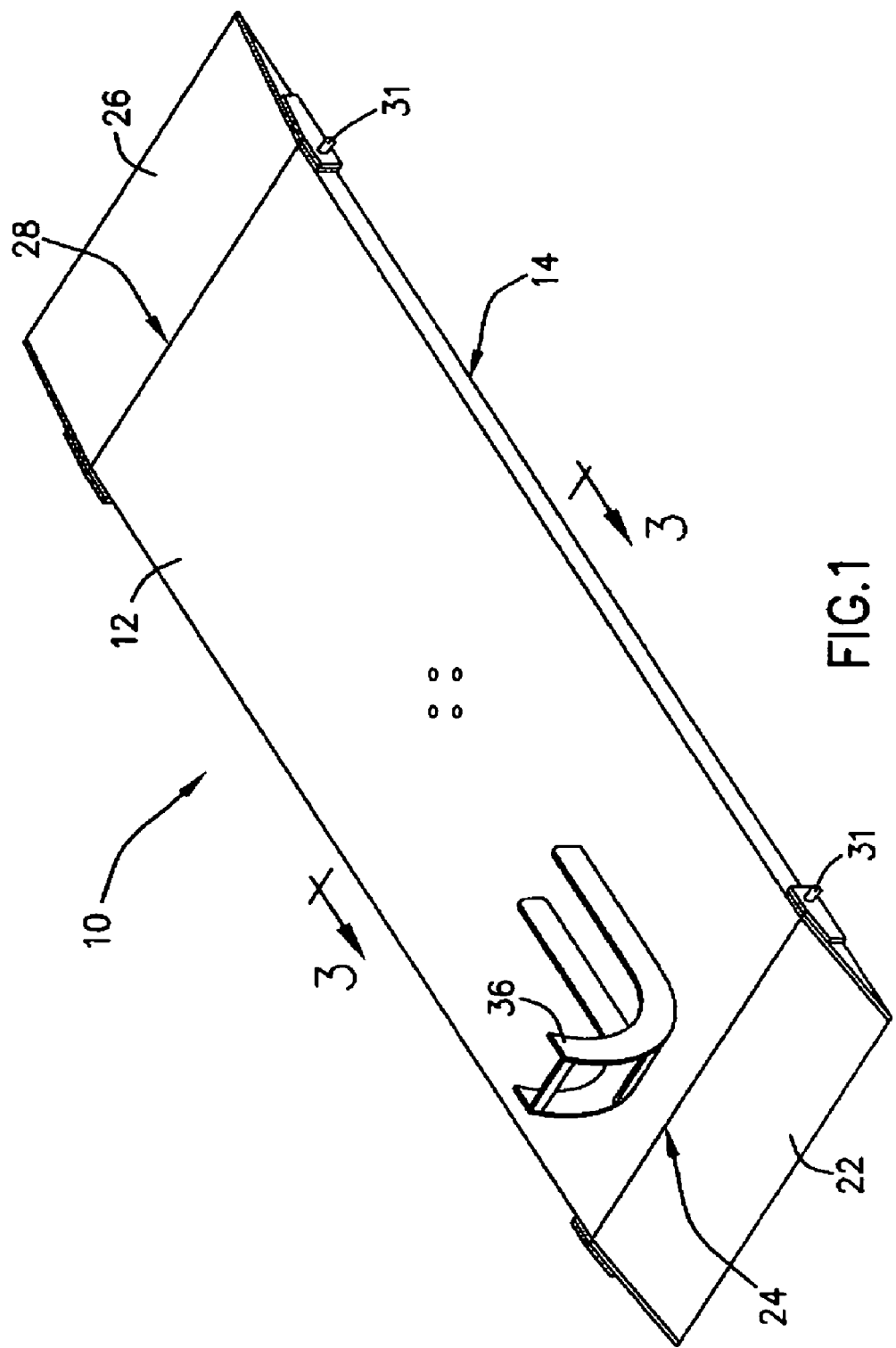
FIG. 1 is an isometric view of the preferred embodiment of the vehicle support platform constructed in accordance with the principles of the present invention.
Figure 2:
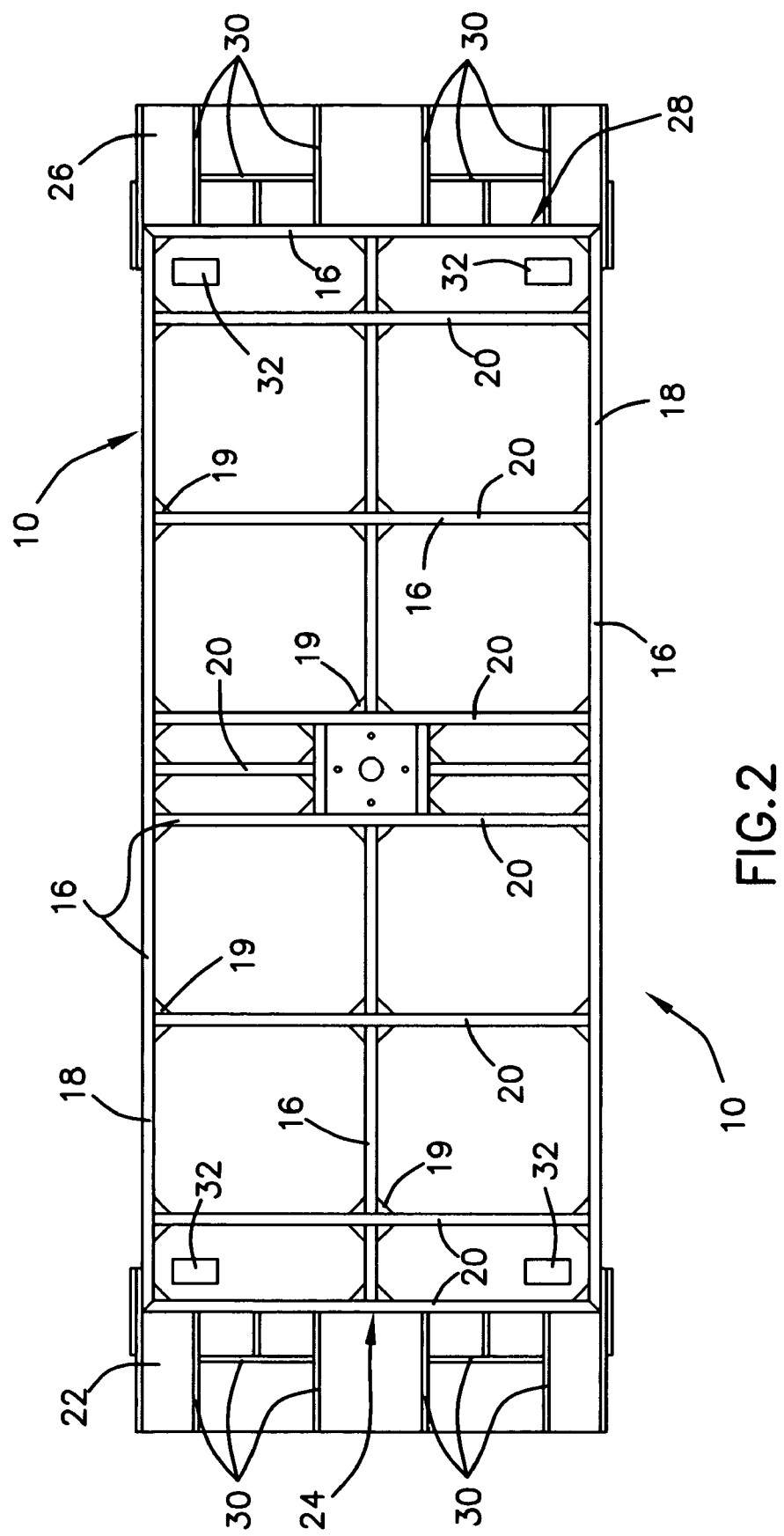
FIG. 2 is a bottom plan view of the support frame of vehicle support platform.

Referring to FIGS. 1 and 2, a support platform 10 comprises a support deck 12 attached to a support frame 14. By way of example, not limitation, the support platform can be 96 inches in length and 40 inches in width. The deck 12 is preferably of an aluminum sheet having a textured surface, such as a diamond-patterned texture. The support frame 14 is constructed from a plurality of frame members 16, including at least two longitudinal members 18 and plurality of transverse members 20 which are orthogonally attached to and extend between the longitudinal members 18. Gussets 19 are used to increase the strength of the junction points of the frame members 16. Preferably, the frame members 16 are of hollow tubes, more preferably of hollow tubes having a rectangular or square cross section. Most preferably, the frame members 16 are a lightweight, high load bearing material, such as aluminum. The use of a lightweight, high load bearing material for the frame members is important to reduce the weight of the support platform 10, which makes the support platform more maneuverable for an average consumer.

The support platform 10 further includes a first ramp 22 pivotally attached to a first end 24 of the support frame 14, and a second ramp 26 pivotally attached to a second end 28 of the support frame. The ramps 22 and 24 include a plurality of support members 30 to increase the load bearing ability of the ramps and to make the ramps self-supporting. The ramps 22 and 24 can be pivotally attached to the support frame; for example, by using a pair pivot pins 31. Various other methods of pivotally attaching the ramps 22 and 24 can be used and are of knowledge in the prior art. Preferably, the ramps 22 and 24 are removably attached to the support frame 14.

Four caster wheels 32 are attached to the support frame 14 around the interior perimeter of the frame about the approximate corners. The caster wheels 32 engage a support surface 34 and support the entire weight of the support platform 10 and a vehicle supported thereon on the support surface (Best illustrated in FIG. 3). Due to the design of the support frame 12 and the positioning of the caster wheels 32, the support platform 10 does not require any additional underlying support in contact with the support surface 34 to support the weight of the platform and the vehicle positioned on and supported by the support platform. The caster wheels 32 are recessed within the support frame 12 to reduce the profile height of the support platform. Preferably, the support platform 10 has a maximum profile height of three inches. The low profile height of the support platform 10 provides for the storage of the platform on a typical garage floor while allowing a vehicle to drive over the platform without causing an obstruction to the vehicle.

Figure 4:
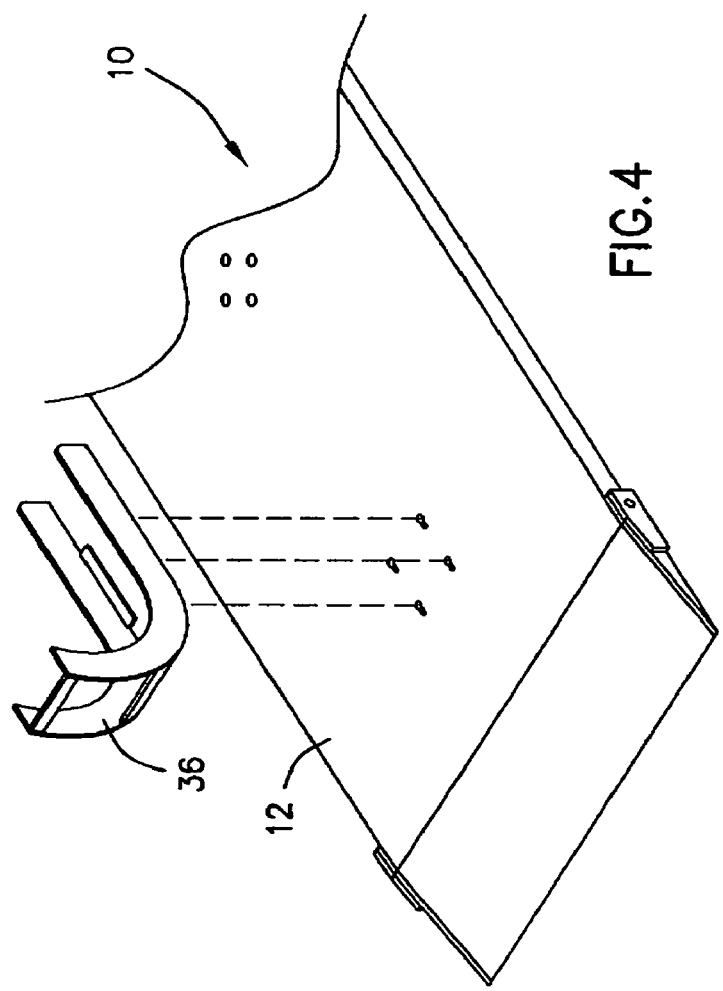
FIG. 4 is an enlarged partial isometric view illustrating the wheel engagement member detached from the support platform.

Referring to FIGS. 1 and 4, a wheel engagement member 36 for receiving a wheel of vehicle, such as a two-wheeled vehicle and supporting the vehicle in a generally upright position can be attached to the support deck 12. Preferably, the wheel engagement member 36 is removably attached to the support deck 12. In alternate embodiments, a plurality of wheel engagement member 36 can be attached to the support deck 12.

Figure 3:
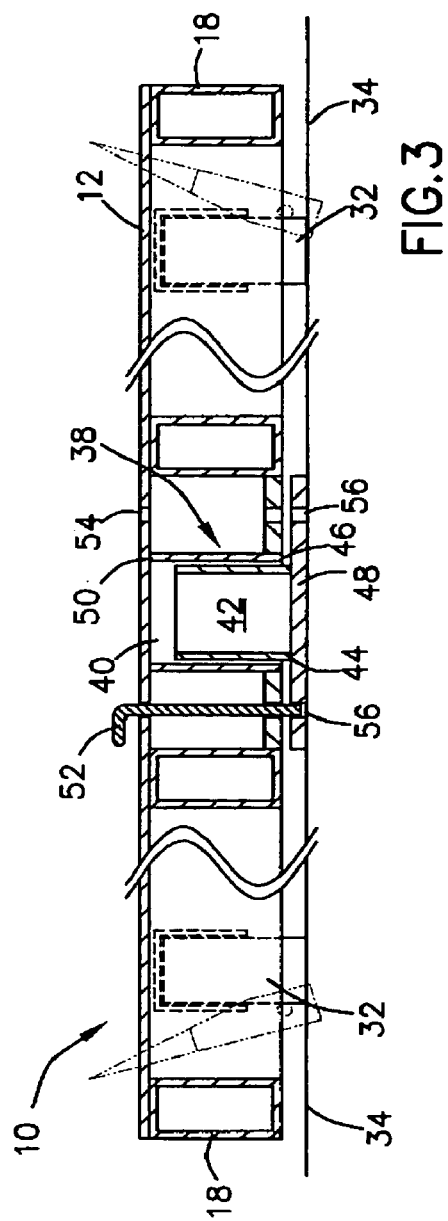
FIG. 3 is a cross sectional view taken along line 3—3 in FIG. 1 illustrating the pivot column.

Turning to FIG. 3, a pivot assembly 38 can be used to provide a fixed pivot point for rotating the support platform 10 within a confined space. It is important to note to reduce the complexity and cost of the pivot column assembly 38 it is not intended to be load bearing, and in fact would not operate correctly if an axial load were applied. The pivot column assembly 38 includes a first hollow column 40 and a second column 42 that is rotatably received coaxially within the first column 40. The second end 44 of the second column 42 extends beyond the second end 46 of the first column 40 and is fixedly attached to a mounting plate 48. The first end 50 of the first column 40 is fixedly attached to a center point of the support platform 10.

The pivot assembly 38 can include a retention pin 52 for locking the support platform 10 from rotating about the pivot assembly. In this application, a plurality of through holes 54 are formed through the support deck 12 radially around the center point of the support platform 10. A plurality cooperating holes 56 are formed in the mounting plate 48 radially around the second end 44 of the second column 42. To lock the support platform 10 from rotating about the pivot assembly 38, the retention pin 52 is passed through a hole 54 into a cooperation hole 56, thereby locking the support platform from rotating.

Turning to FIG. 5, the support platform 10 can include a plurality of tie-downs 58, such as cleats or eyebolts, attached around the perimeter of the support platform. Tie down cables can be used to secure a vehicle to the support platform in a generally upright position by securing the tie down cables to the tie-downs.

Referring to FIGS. 6 and 7, the support platform 10 can be of two separate sections 60 and 62 pivotally joined together by a hinge 64. The two sections 60 and 62 of the platform 10 can be folded together into a compact, folded storage position. Preferably in the folded storage position, the platform does not exceed thickness or height of 6 inches and is approximately half the original length. To reduce the length even more, the ramps 22 and 24 can be removed. For exemplary purposes the hinge 64 is illustrated as a typical piano hinge having leafs 66 attached to support frame 12. However, it would be readily apparent to one of ordinary skill that other means for pivotally attaching the sections 60 and 62 together can be substituted for the hinge 64.

To prevent the support platform 10 from collapsing when unfolded and in use, a lock means 68 for locking the sections 60 and 62 from folding is provided. As an example, the lock means 68 can include a sliding bar 70 which is passed through adjacent frame members 16 of the sections 60 and 62 orthogonal to the hinge 64 of the support platform 10, thereby preventing the sections from folding when the support platform is in use.

Because the support platform 10 is constructed from a light weight material, it is easily lifted and maneuvered and can be used as a loading ramp, for example to load a recreation vehicle, such as motorcycle, ATV or snowmobile onto the bed of a pickup truck or the like.

To reduce expense to a consumer, it is contemplated to provide the support platform 10 unassembled or partially assembled, thereby requiring the assembly of the support platform by the consumer.

While a preferred embodiment of the vehicle support platform has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

We claim:

1. A vehicle support platform comprising:
   a vehicle support deck of a generally rectangular shape having a top surface and a bottom surface;
   a deck support frame constructed from a plurality of frame members, said deck support frame having a top surface, a bottom surface, a first end a second end and two sides, the bottom surface of said vehicle support deck is attached to the top surface of said deck support frame;
   a first ramp pivotally attached to the first end of said deck support frame;
   a second ramp pivotally attached to the second end of said deck support frame; and
   four casters attached to said deck support frame; and
   a pivot assembly comprising a first hollow column having a first end and a second end, a second column having a first end and a second end that is rotatably received by the first column with the second end thereof extending beyond the second end of the first column, a mounting plate fixedly attached to the second end of the second column; and wherein the first end of the first column is fixedly attached to the support platform at about a center point thereof.

2. The vehicle support platform of claim 1, wherein said deck support frame is constructed of two longitudinal side members and a plurality of transverse members attached orthogonal to and extending between the two longitudinal side members, and wherein the longitudinal side members and the transverse members are hollow tubular members.

3. The vehicle support platform of claim 1, further comprising:
   a vehicle wheel engagement member releasably attached to said support deck.

4. The vehicle support platform of claim 1, further comprising:
   at least one retention pin; and wherein the support platform has a plurality of through holes formed through said support deck radially around the center point thereof and the mounting plate has a plurality of through holes formed therethrough radially around the second end of the second column and in cooperative alignment with the through holes formed through said support deck, said at least one retention pin is received by a pair of cooperating through holes formed through said support deck and the mounting plate to lock the support platform from rotating.

5. The vehicle support platform of claim 1, further comprising:
   a plurality of tie-downs positioned around the perimeter of said support deck.

6. The vehicle support platform of claim 1, further comprising:
   a hinge, wherein the support platform is of two separate pieces joined together by said hinge so that the support platform can fold into a folded compact storage position; and
   a lock means for locking the support platform in an unfolded in-use position.

7. A support platform for supporting and maneuvering a vehicle within a confined space comprising:
   a vehicle support deck of a generally rectangular shape having a top surface and a bottom surface;
   a deck support frame constructed from a plurality of frame members, said deck support frame having a top surface, a bottom surface, a first end, a second end and two sides, the bottom surface of said vehicle support deck is attached to the top surface of said deck support frame;
   a first ramp pivotally attached to the first end of said deck support frame;
   a second ramp pivotally attached to the second end of said deck support frame;
   four casters attached to said deck support frame
   said deck support frame is constructed of at least two longitudinal side members and a plurality of transverse members attached orthogonal to and extending between the two longitudinal side members, and wherein the longitudinal side members and the transverse members are hollow tubular members; and
   a hinge, wherein the support platform is of two separate pieces joined together by said hinge so that the support platform can fold into a folded compact storage position; and
   a lock means for locking the support platform in an unfolded in-use position.

8. The vehicle support platform of claim 7, further comprising:
   a pivot assembly comprising a first hollow column having a first end and a second end, a second column having a first end and a second end that is rotatably received by the first column with the second end thereof extending beyond the second end of the first column, a mounting plate fixedly attached to the second end of the second column; and wherein the first end of the first column is fixedly attached to the support platform at about a center point thereof.

9. The vehicle support platform of claim 8, further comprising:
   at least one retention pin; and wherein the support platform has a plurality of through holes formed through said support deck radially around the center point thereof and the mounting plate has a plurality of through holes formed therethrough radially around the second end of the second column and in cooperative alignment with the through holes formed through said support deck, said at least one retention pin is received by a pair of cooperating through holes formed through said support deck and the mounting plate to lock the support platform from rotating.

10. The vehicle support platform of claim 7, further comprising:
    a vehicle wheel engagement member releasably attached to said support deck.

11. A vehicle support platform comprising:
    a vehicle support deck of a generally rectangular shape having a top surface and a bottom surface;
    a deck support frame constructed from a plurality of frame members, said deck support frame having a top surface, a bottom surface, a first end, a second end and two sides, the bottom surface of said vehicle support deck is attached to the top surface of said deck support frame;

a first ramp pivotally attached to the first end of said deck support frame;
a second ramp pivotally attached to the second end of said deck support frame; and
four casters attached to said deck support frame;
a hinge, wherein the support platform is of two separate pieces joined together by said hinge so that the support platform can fold into a folded compact storage position; and
a lock means for locking the support platform in an unfolded in-use position.

12. The vehicle support platform of claim 11, further comprising:
a plurality of tie-downs positioned around the perimeter of said support deck.

13. The vehicle support platform of claim 11, further comprising:
a vehicle wheel engagement member releasably attached to said support deck.

* * * * *